INVENTOR

Günter Martens

BY Michael S. Striker his ATTORNEY

ELECTRONIC STORAGE AND CALCULATING ARRANGEMENT

Filed April 25, 1960 10 Sheets-Sheet 2

REGISTER SR

INVENTOR
Günter Martens
BY Michael S. Striker
his ATTORNEY

INVENTOR
Günter Martens
BY Michael S. Striker
his ATTORNEY

March 31, 1964 G. MARTENS 3,127,507

ELECTRONIC STORAGE AND CALCULATING ARRANGEMENT

Filed April 25, 1960 10 Sheets-Sheet 4

INVENTOR
Günter Martens
BY Michael S. Striker
his ATTORNEY

ELECTRONIC STORAGE AND CALCULATING ARRANGEMENT

Filed April 25, 1960 10 Sheets-Sheet 5

Gates 3

INVENTOR
Günter Martens
BY Michael S. Striker
his ATTORNEY

INVENTOR
Günter Martens
BY Michael S. Striker
his ATTORNEY

INVENTOR
Günter Martens
BY Michael S. Striker
his ATTORNEY

INVENTOR
Günter Martens
BY Michael S. Striker
his ATTORNEY

INVENTOR
Günter Martens
BY Michael S. Striker
his ATTORNEY

INVENTOR
Günter Martens
BY Michael S. Striker
his ATTORNEY 3,127,507
ELECTRONIC STORAGE AND CALCULATING ARRANGEMENT Günter Martens, Schliersee, Upper Bavaria, Germany, assignor to Kienzle Apparate G.m.b.H., Villingen im Schwarzwald, Germany Filed Apr. 25, 1960, Ser. No. 24,281
Claims priority, application Germany Apr. 24, 1959
9 Claims. (Cl. 235—173)

Figure 1:
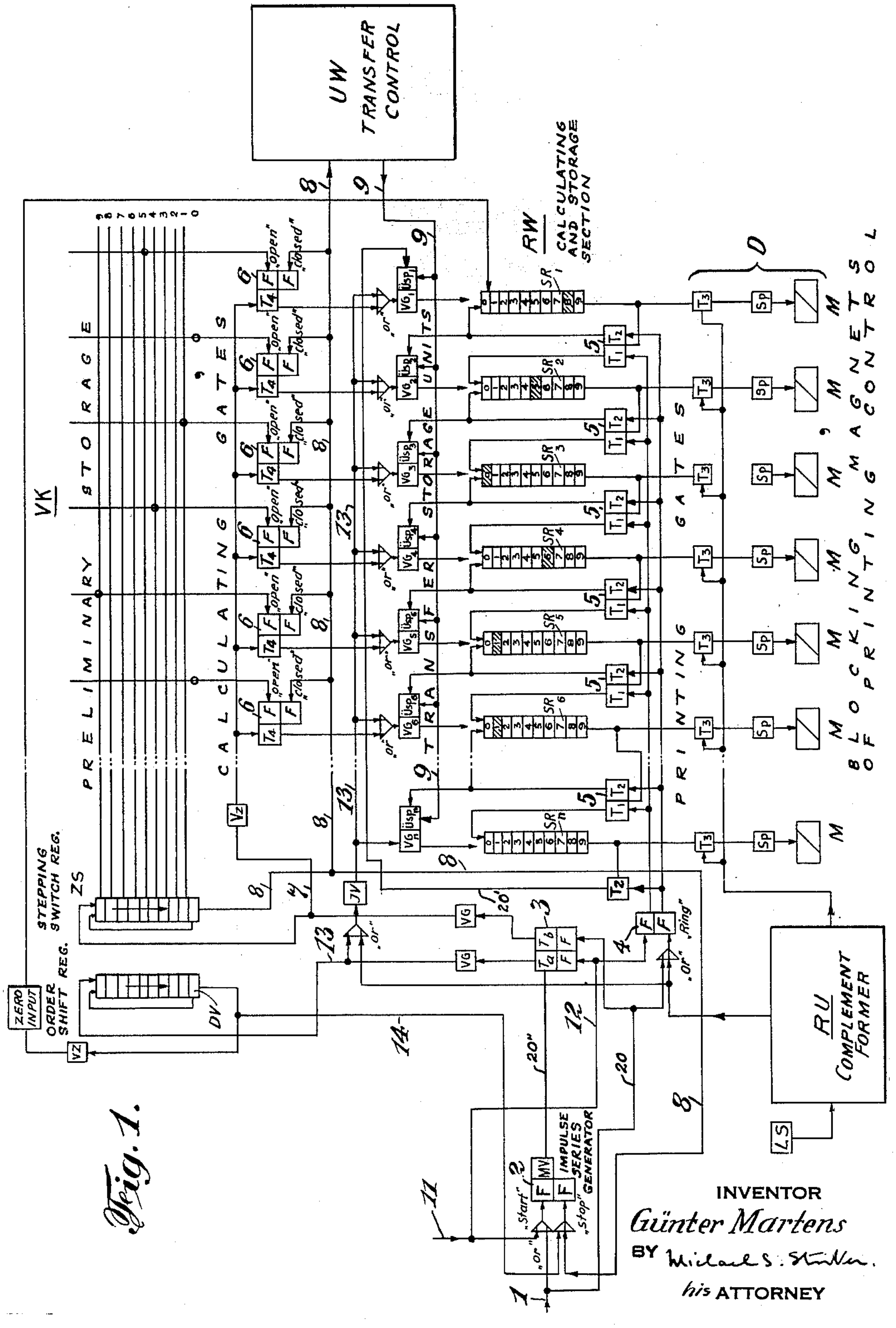

The present invention concerns an electronic storage and calculating arrangement which is particularly useful in connection with bookkeeping machines and is preferably intended to be used in connection with such machines in which the numbers to be processed, i.e. the individual digits thereof are available in parallel arrangement and are to be introduced into the calculating and storage arrangement in parallel with each other and are to be delivered by the calculating and storage arrangement in parallel with each other.

Up to now mechanical bookkeeping machines have been widely used which are quite reliable in operation but are not satisfactory any more in view of modern requirements of operating speed, storage capacity and diversified applicability as for instance in connection with punched tape recording or magnetic tape recording, and also in view of the desirable number and extent of possible calculating operations.

In particular, such mechanical bookkeeping machines hardly permit carrying out, as a third calculating operation, the multiplication of numbers within a reasonably short time period.

Therefore, attempts have been made to develop bookkeeping machines having an electronic calculating arrangement. Most of the so far known electronic calculating arrangements process the number values, digit values and order values in series sequence and therefore require the input of said values in series while the calculated results must also be delivered in series.

However, in the known mechanical adding bookkeeping machins the transfer of the number values from the keyboard or from a control carriage into the calculating section as well as the priniting of the calculated results are carried out in all order positions of the particular multi-order number simultaneously, i.e. in parallel, so that an electronic calculating arrangement as mentioned above and operating in series can hardly be combined with such a mechanical bookkeeping machine. It has been further proposed to provide electronic calculating arrangements operating in parallel, e.g. with the aid of decimal counting tubes or of tube tetrad arrangements, which were assumed to be better suited for being connected with the adding bookkeeping machines than serial calculators.

However, it has been found that a particular difficulty arises in the use just of these devices whenever order shifting is required as e.g. in all multiplications with multi-order numbers, in the case of multiplications by means of multiple addition, or in the case of multi-order divisions by means of multiple subtraction.

The simplest way of order shifting in an electronic calculating arrangement would be to inject into each one of the individual units assigned respectively to different orders ten impulses so as to shift in this manner the particular stored value into the next unit assigned to the next following order. However, it has been found that this very efficient method cannot be applied to the electronic calculating arrangements known up to now. This is due to the fact that in this case, the order shifting would have to be carried out in sequence for one order after the other individually, starting with the highest order and proceeding to the lowest order. This would require a substantial amount of control devices, and in addition this procedure would involve a substantial loss of operating time whereby the operating speed of such electronic arrangements would be again greatly reduced. However, this involved and bothersome procedure is actually due only to the fact that conventional electronic circuit arrangements using tube or transistor tetrad arrangements or counting tubes of the E1T or other types permit only of storing one information at a time. Even electrical calculating arrangements using ten-contact magnets can only store one information per order. However, if an order shifting in the intended manner is to be carried out in all order positions or units simultaneously by injecting ten impulses each into the input of all individual order units, it cannot be avoided that in the individual order units during the shifting operation by ten single steps two in formations appear simultaneously though temporarily.

For instance, if in the unit assigned to the lowest order the value "8" and in the next following higher order unit the value "2" are stored, and if simultaneously ten shifting impulses are injected into each of these order units, for shifting these values into the unit assigned to the second and third order, then temporarily two values appear in the unit of the second order because the value representing "2" has not yet been shifted through its own order unit at the moment when the value "8" transferred from the unit of the next lower order arrives in the unit asigned to the second order.

In view of the above considerations the main object of the present invention is to overcome the described difficulties.

More particularly, it is an object of the present invention to provide for an arrangement which satisfies the following conditions:

In connection with bookkeeping machines and other machines adapted to carry out the input into electronic calculating machines and to receive the output therefrom, both operations being carried out in parallel for all the orders of the number being processed, an electronic calculating and storage arrangement must be provided to receive and to deliver number information in parallel as far as the different orders are concerned so that this calculating and storage arrangement can cooperate with the particular machine. However, it must be possible also to process the digits in each individual order position in series, i.e. selectively regarding time because the mechanical control elements of the above mentioned type of machines, e.g. type control rods or number wheels must operate mechanically and selectively in terms of time because the above mentioned mechanical control or indicating elements have to pass sequentially through the positions corresponding to the digits 0 to 9.

On the other hand, when the calculating arrangement is switched to the just mentioned second mode of operation, it must be capable of processing the digits and the respective orders in a series-series arrangement, i.e. the individual digits must appear at the output in series, and the individual orders following one another, in view of the requirements appearing in order shifting as mentioned above. Moreover, it must be possible in this case where order shifting is done by means of ten shifting steps carried out by the stored information within the individual order unit, and from one order unit into the next one, to solve the problem of simultaneously storing two informations within one order unit, as a matter of fact, in certain extreme cases, even simultaneously storing two informations in adjoining or consecutive storage elements of one order unit. This may occur if from one order unit a "9" and from the next following order unit a "0" are to be transferred into the respectively following order units, because during a ten-step shifting the adjoining or neighboring digit values "1" and "0"
"2" and "1"
"3" and "2", etc.

pass through one individual order unit until the original value "0" after ten steps has been transferred into the "0" element of the next following order unit, while the following "9" has been transferred into the "9" element of that unit.

While the above discussed main conditions for an improved calculating arrangement concern an operation with (1) Digits in series, orders in parallel;
(2) Digits in series, orders in series;
(3) Two informations in neighboring elements of each order unit, additional conditions may apply which are of importance in certain cases in connection with functions of the arrangement which do not require detailed discussion here.

In view of all the above mentioned possible conditions to be satisfied, an important object of the invention consists in providing for a storage and calculating arrangement, and particularly for the individual order units thereof, a possibility of switching the same as follows:

(1) Digit representation in series, orders in parallel; each order unit closed in itself as a "small ring";
(2) Digit representation in series, orders in parallel; order units without ring connection ("small chain");
(3) Digit representation in series, orders in series; order units without ring connection, storage and calculating arrangement connected as "large ring";
(4) Digit representation in series, orders in series; order units without ring connection, storage and calculating arrangement connected as "large chain."

It will be understood that the case listed above at (1) can be subdivided into two modifications, namely, (1*a*) Connection of each order unit as a closed ring together with transfer of an information passing through the ring, into a transfer storage unit during the calculating operation; and
(1*b*) Connection of each order unit in a closed ring without transfer into a transfer storage unit, as required during the printing operation.

The arrangements or connections as listed above at 1*a*, 1*b*, 2, 3 and 4 are utilized specifically e.g. in carrying out the following functions of an electronic calculating apparatus.

(1*a*) *Small Ring Arrangement Together With Transfer To Transfer Storage Units*

*Application: Input.*—Additive or subtractive (complementary addition) input of digit values in parallel from a preliminary storage. Input of digit values in parallel from a preliminary storage by multiple addition or multiple subtraction for the purpose of multiplication or division. Preliminary storages may be of the electro-mechanical type as for instance a multiple-contact panel of a bookkeeping machine as described below, or also an electronic intermediate storage, preferably of the same type as the storage and calculating arrangement described below. The number values to be processed are introduced with the different orders in parallel from the preliminary storage accumulatively into the order units of the calculating and storage arrangement. The resulting value is obtained and stored in the particular order unit connected as a shift ring and a transfer appearing upon exhaustion of the storage capacity of the order unit is transferred to a transfer storage for further processing.

(1*b*) *Small Ring Arrangement Without Transfer To Transfer Storage Units*

*Application: Output.*—Delivery of digit values from the storage and calculating arrangement by means of input of groups of impulses of ten impulses each into each order unit in parallel, re-establishment of the storage of the particular value to be printed, in the storage and calculating arrangement after rotation of the stored information in each order unit. Transfer of an impulse after exhaustion of the storage capacity of the individual order unit connected as a shift ring to a blocking magnet associated with each order unit of the printing units of the information delivering machine as described below.

(2) *Small Chain Arrangement*

*Application.*—Complementation.

(3) *Large Ring Arrangement*

*Application.*—Shifting of stored information in direction to the right.

(4) *Large Chain Arrangement*

*Application.*—Shifting of stored information in direction to the left.

All the above conditions are met satisfactorily by the arrangement according to the invention which entails the further advantage of being comparatively inexpensive. In addition, it will be seen that an arrangement according to the invention requires much less space than the known electronic calculating arrangements. This makes it possible to assemble an electronic arrangement according to the invention without difficulties with an existing mechanical bookkeeping machine. Further advantages of the invention will be discussed at the end of the specification.

With above objects in view, an electronic storage and calculating arrangement for processing multi-order numbers comprises, according to the invention, in combination, an electronic accumulator arrangement comprising a plurality of shift registers sequentially assigned to consecutive orders of said numbers, respectively, and having each a series of ferromagnetic cores sequentially assigned to different digits and having a rectangular hysteresis characteristic and each being capable of storing alternatively digit-representing and no-digit representing information depending upon the polarity of magnetic saturation thereof, and including circuit means for applying impulses of predetermined polarity for reversing the polarity of the magnetization of any one of said cores and for shifting stored information along said series of cores; circuit means interconnecting said shift registers and including switching means capable of establishing alternatively either one of two connections of said shift registers, one connection serving to close the individual shift registers to a shift ring in itself for transferring digit information from the last core of the particular register to the first core thereof upon the application of one of said impulses, the other connection serving to connect said plurality of shift registers to a chain of registers for transferring, upon application of said impulses, the information stored in each individual one of said shift registers assigned to respective orders, to the respectively sequent shift register whereby the total stored digit information is shifted by one order step; and input means for applying said impulses to said shift registers.

In a preferred embodiment of the invention gate circuits are arranged between each two order units, respectively, one gate in each gate circuit causing the ring connections and the other gate thereof causing the chain connections, an electronic switching device, e.g. a flip-flop, being provided for controlling a group of the above mentioned gates depending upon the particular function to be performed by the machine.

Figure 2A:
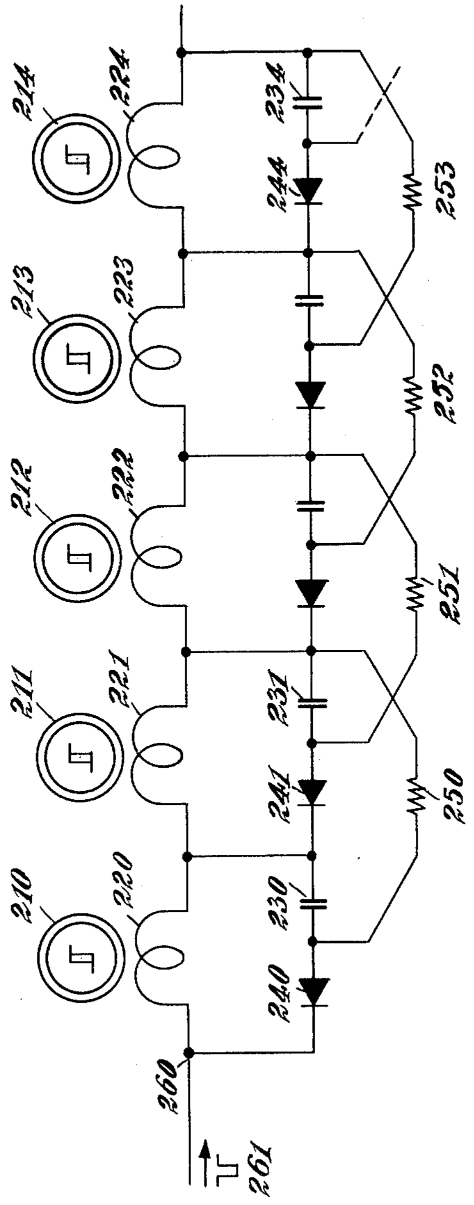
Figure 2B:
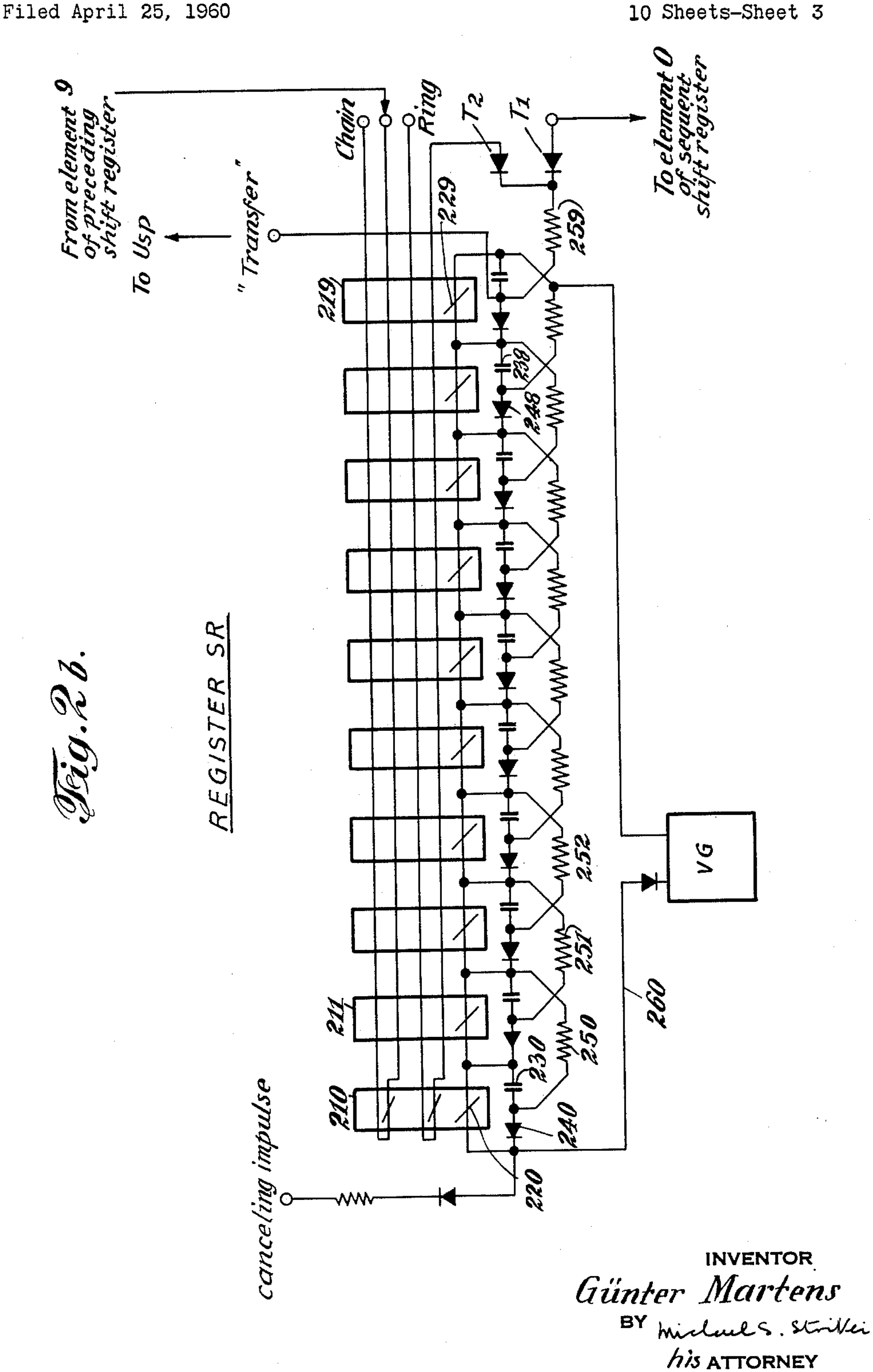
Figure 3:
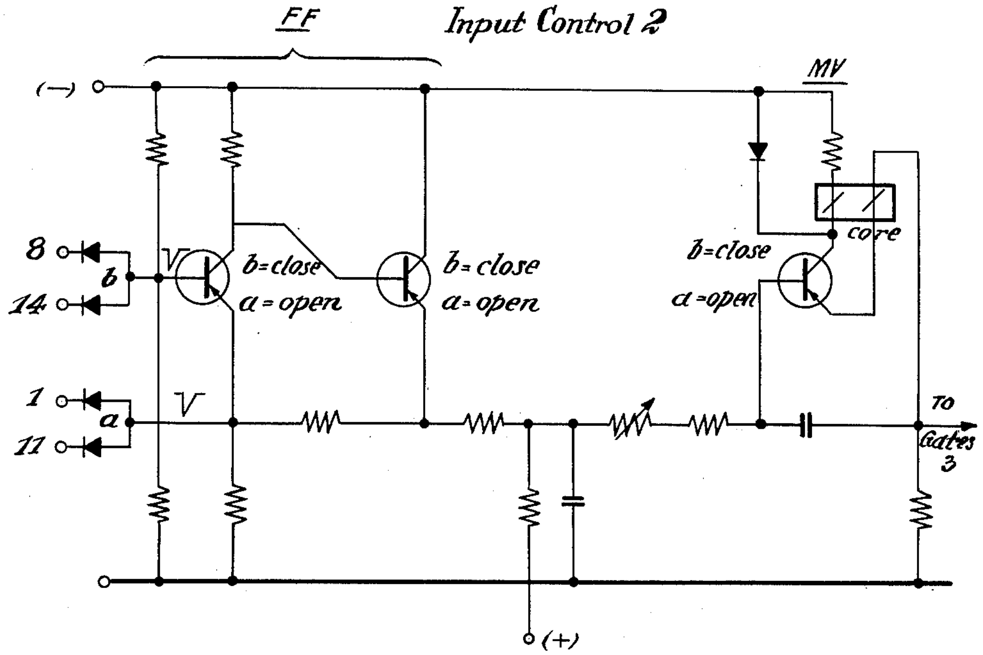
Figure 3A:
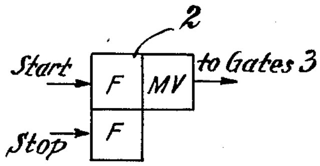
Figure 4A:
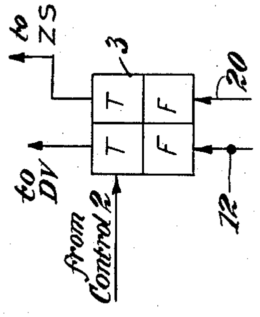
Figure 4:
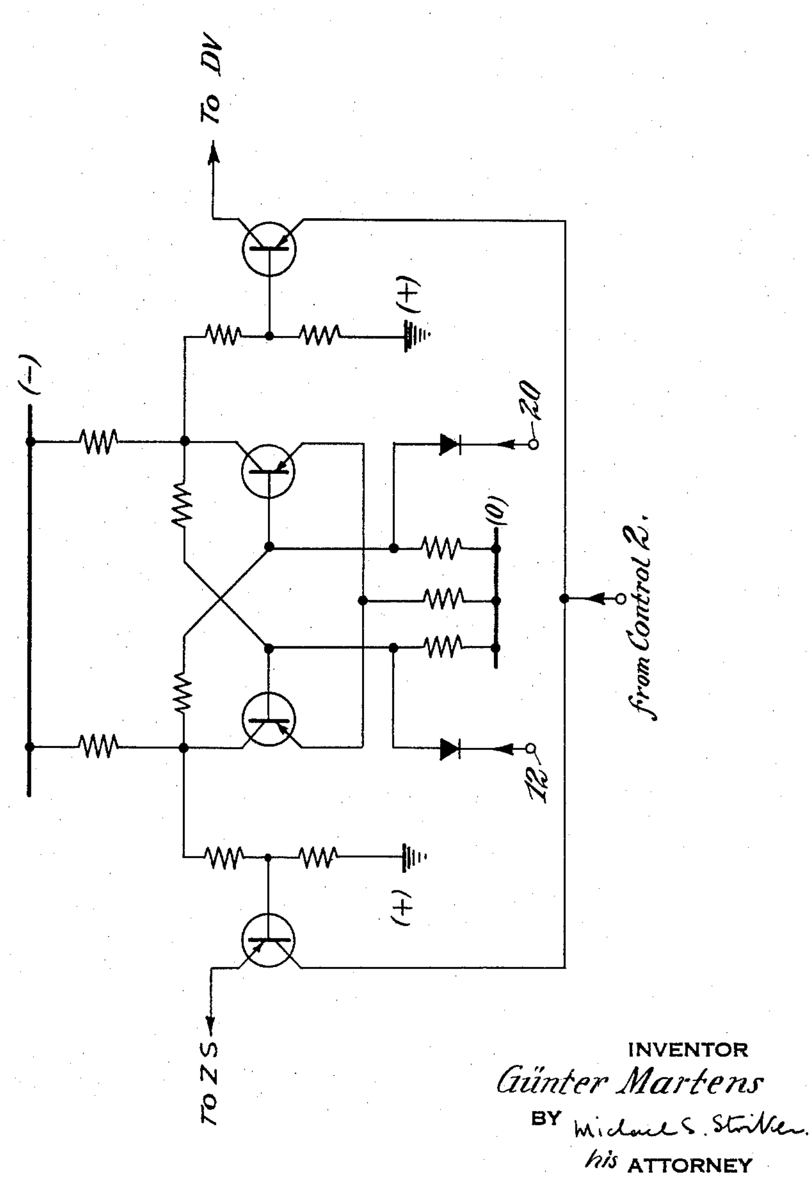
Figure 5C:
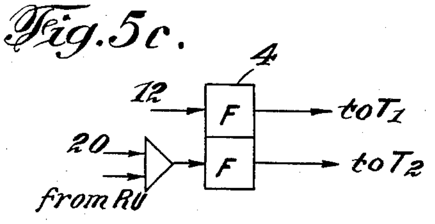
Figure 5A:
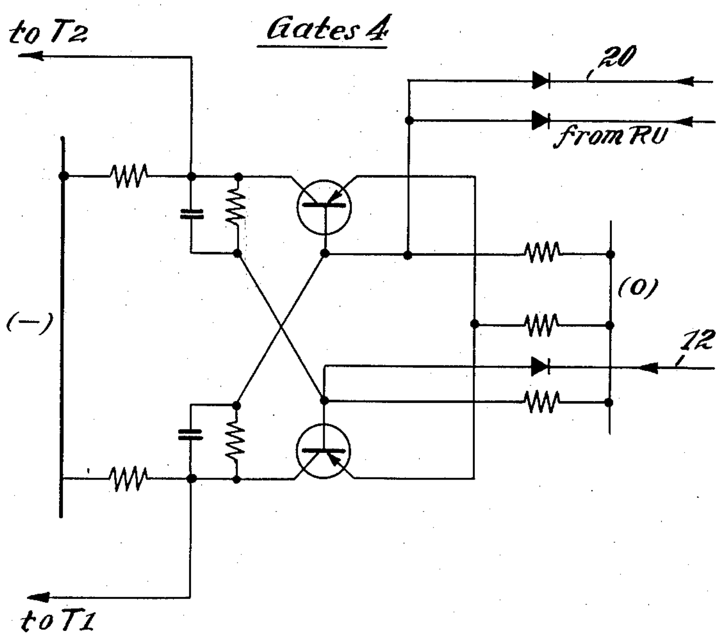
Figure 5B:
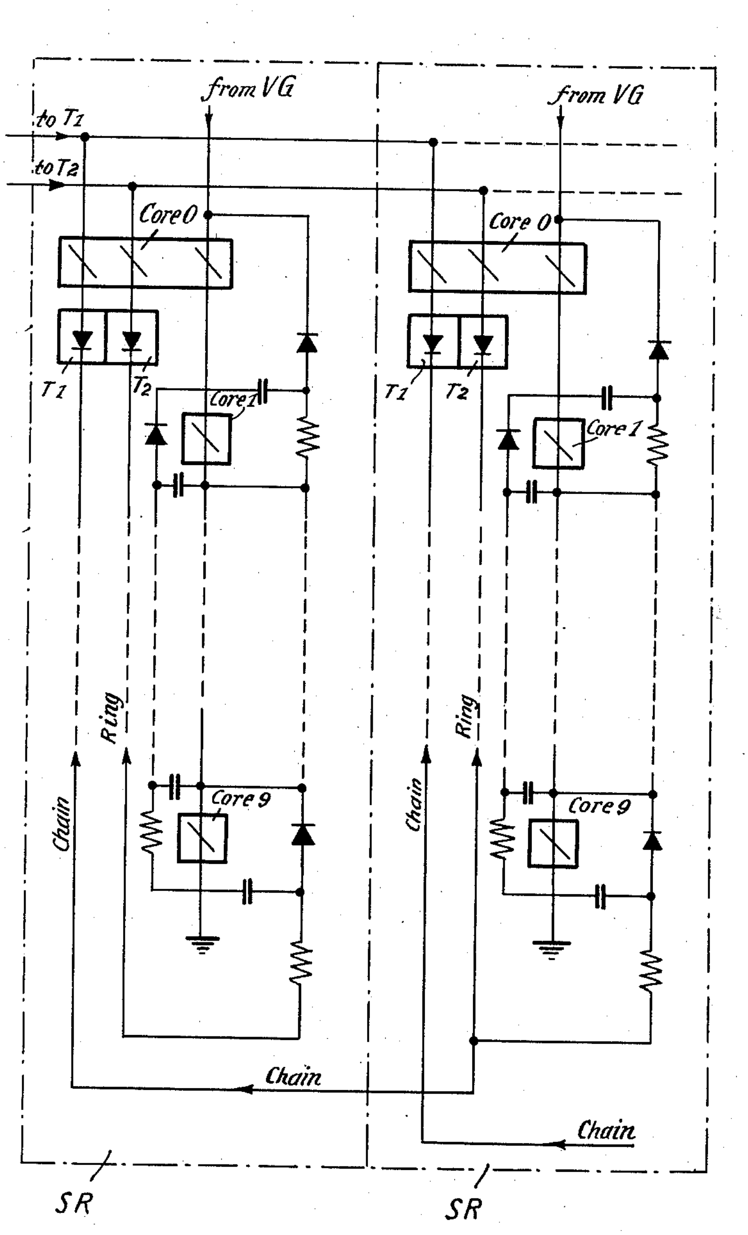
Figure 6A:
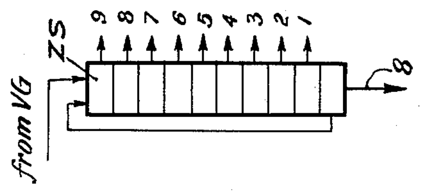
Figure 6:
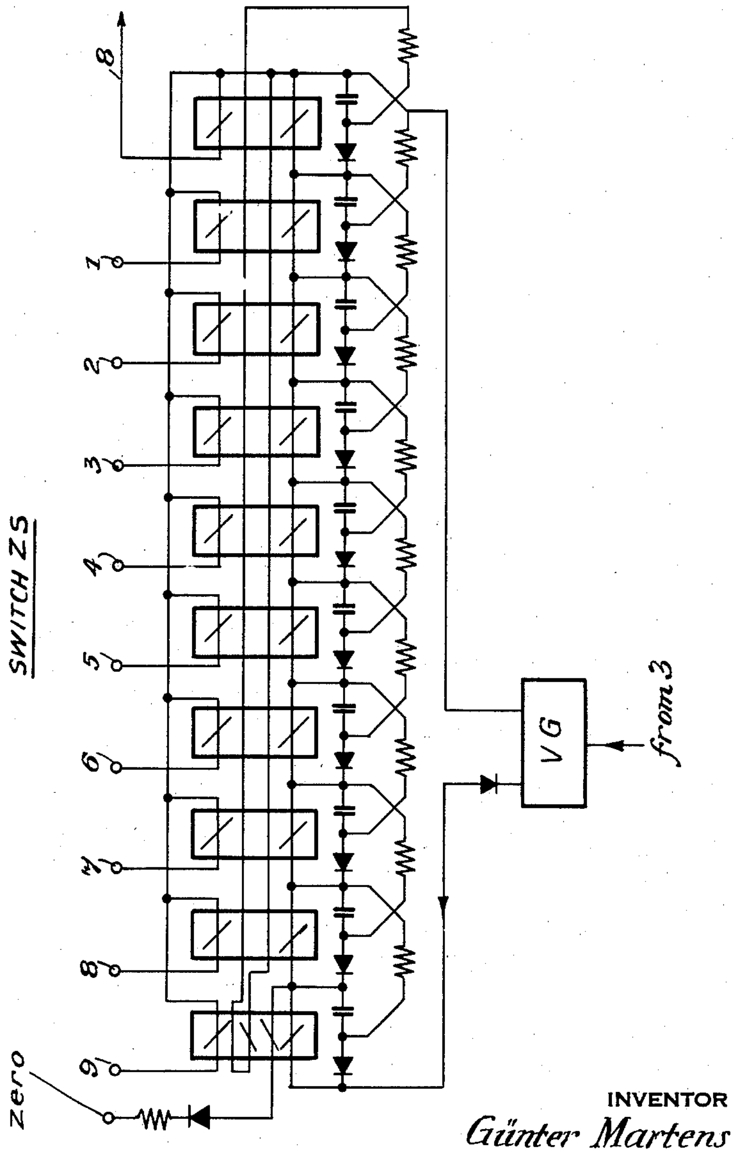
Figures 7, 7A:
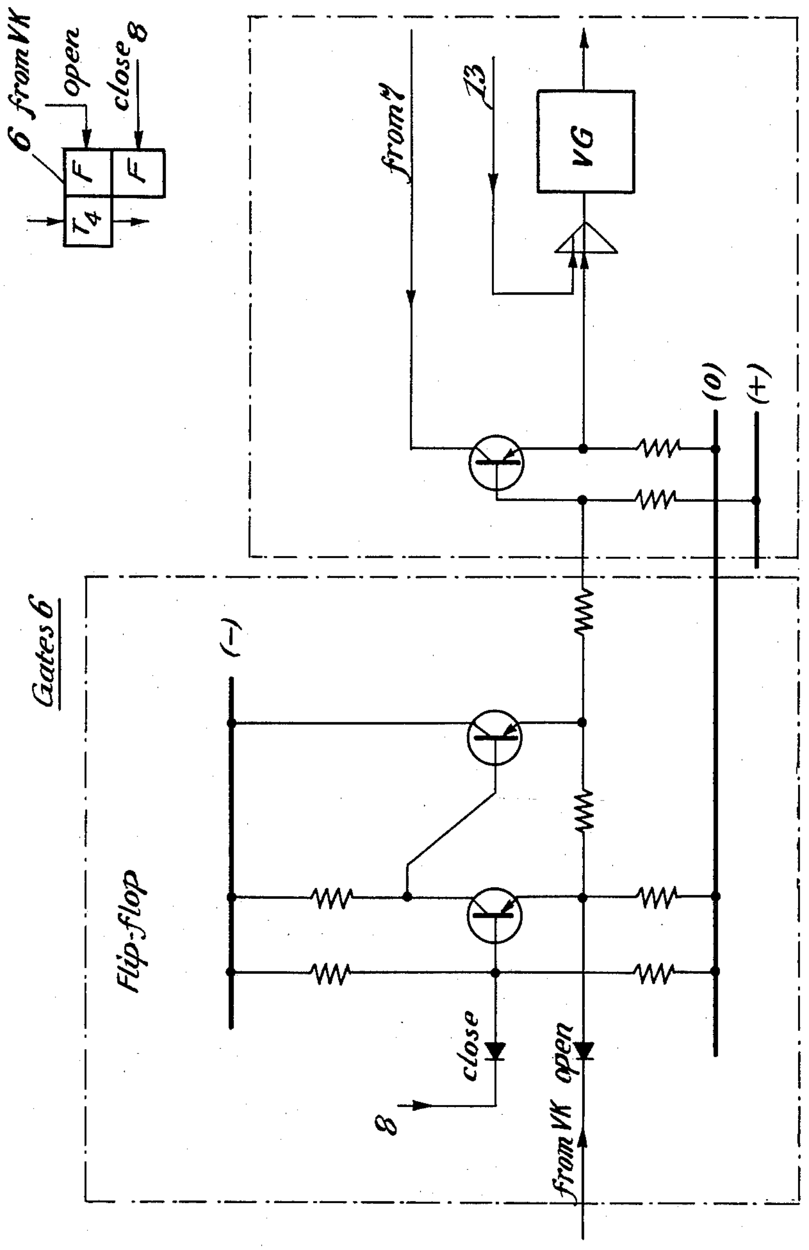
Figure 8:
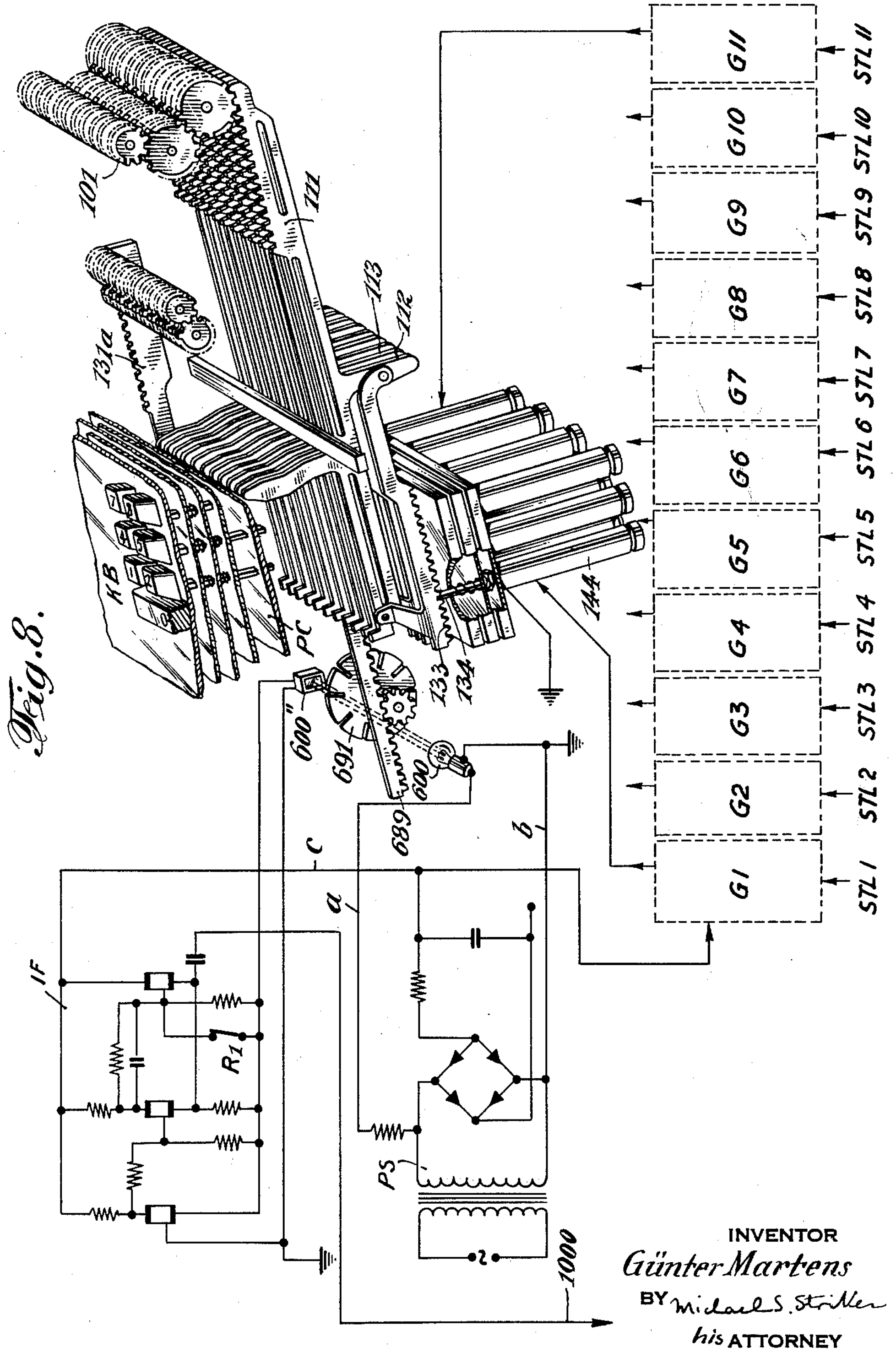

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic block diagram illustrating the general arrangement according to one embodiment of the invention;

FIGS. 2*a* and 2*b* are schematic block diagrams illustrating the shift registers used in the embodiment of FIG. 1;

FIGS. 3 and 3*a* are detail diagrams of a start-stop impulse generator forming part of said embodiment;

FIGS. 4 and 4*a* illustrate in greater detail a switching arrangement forming part of said embodiment;

FIGS. 5*a*, 5*b* and 5*c* illustrate diagrammatically a switching arrangement for changing a ring connection to a chain connection;

FIGS. 6 and 6*a* illustrate a digit value stepping switch arrangement forming part of said embodiment;

FIGS. 7 and 7*a* illustrate diagrammatically a gate arrangement of said embodiment; and FIG. 8 illustrates partly in perspective view and partly in the form of a circuit diagram a printing arrangement that may be controlled by the arrangement according to FIG. 1.

FIG. 1 illustrates diagrammatically the following components and their interconnections:

(1) A calculating and storage section RW composed of a plurality of shift registers $SR_1$ to $SR_n$ and including a corresponding plurality of control gates 5;
(2) A multi-contact panel VK serving as preliminary storage for the number values to be processed;
(3) A plurality of calculating gates 6 arranged between the panel VK and the storage device RW;
(4) A plurality of transfer storage units US*p* as accessories to the storage and calculating device RW and transfer control means UW connected therewith for processing the transfers;
(5) A digit value step switching device ZS for the read-out of the panel VK;
(6) An impulse generator MV for the production of series of ten impulses each, connected with a start-stop flip-flop 2;
(7) A complement former RU;
(8) A plurality of printing gates $T_3$ for controlling the output to a printing device;
(9) A plurality of blocking devices for the not shown mechanical printing control elements.

In FIGS. 1–7*a* all purely mechanical components of the particular machine have been omitted purposely in order not to obscure the drawing intended to illustrate above all the electrical components and the circuitry. The printing devices, printing control means, keyboard and other controls of a bookkeeping machine are well known in the art. By means of such not shown and well known mechanical elements a multi-order number to be processed, e.g. the result of a preceding calculation, is introduced into the multi-contact panel VK which may be of the type of a well known crossing-bar distributor. When a value is introduced it is represented by set contacts connecting selected crossing-bars. It will be understood that this multi-contact panel VK is only an example and that it may be replaced, e.g. by equivalent electronic means.

The next task is to process this value electronically. For this purpose the invention provides, as a main component of the entire arrangement, a synchronously operating calculating and storage section RW which is composed of a plurality of electronic shift registers $SR_1$ to $SR_n$, as shown in FIG. 1. Preferably each of these shift registers is composed of ten annular magnet cores, which are shown in FIG. 1 in the form of small blocks, each marked with a numeral indicating the digit value respectively represented by digit information stored in the particular core. Preferably a particular type of a shift register is provided in this embodiment, this type of a shift register not constituting per se an invention claimed in this application, which, however, entails substantial advantages by being incorporated in the arrangement according to the invention because the required number of components and connections in the entire arrangement is greatly reduced thereby as compared with conventional arrangements. Each core member of a shift register SR is associated or provided with two parallel circuits. One of these circuits consists of a single winding of the magnet core which has a rectangular hysteresis characteristic; the impedance of said winding in opposition against current impulses depends on the magnetization of the respective core. The second of said circuits, connected in parallel to said winding, includes a series combination of a rectifier and a chargeable capacitor together with a pertaining discharge resistor. The discharge resistors are so connected with said two circuits that the discharge current of each capacitor flows through the pertaining resistor to the winding of the next following magnet core in a direction which is opposite to the direction of the shift impulse applied to the particular register.

This particular connection of the register elements makes it possible to use magnet cores having a rectangular hysteresis characteristic and provided each with only one winding. Magnet cores having a rectangular hysteresis characteristic are specifically different in their behavior from conventional "soft" magnet cores. In view of the coercive force of the contemplated magnet cores being practically constant, a magnetization thereof requires a minimum number of ampere-turns, a sudden reversal of the magnetization setting in when the just mentioned minimum number of ampere-turns is exceeded. Due to a sufficient constancy of the coercive force such reversal of the magnetization continues until a definite condition of saturation is reached. On account of the rectangular form of the hysteresis characteristic even a further substantial increase of the magnetizing ampere-turns is not capable to further increase the magnetic flux. Therefore, a magnet core of this type having a rectangular hysteresis characteristic displays the tendency to flip between two limit values of magnetization depending upon in which direction the magnetizing ampere-turns act. Therefore, a magnet core of this type with its winding does not behave like a pure inductance device. As a matter of fact, during the reversal of the magnetization voltages are generated in the windings, but upon interruption of the current flow no disconnecting voltages due to self-induction are produced as is the case in inductance devices having "soft" magnet cores because the previously established flux condition remains unchanged.

In view of the above, the magnet cores of the contemplated type are characterized by the fact that a current impulse of a given polarity flowing through the winding of the core is opposed by a counter voltage or is not opposed by a counter voltage, depending upon the magnetized condition of the core.

The appearance of a counter voltage depends upon a change of flux within the respective magnet core. However, a substantial change of flux in a magnet core having a substantially rectangular hysteresis characteristic can be caused only if the magnet core, in relation to the direction of the externally introduced excitation, is not already in saturated condition. When such a counter voltage is generated in the winding of the magnet core a voltage drop occurs which permits defining an equivalent resistance which will be termed hereinafter as the resistance of the reversal of the magnetization.

Thus, the magnet core having a substantially rectangular hysteresis characteristic constitutes, together with its winding, a dipole which is capable of displaying two possible resistance effects in relation to an applied current impulse.

It is possible to assign to these two opposed conditions which depend upon the preceding action on the magnet core, the meaning of two alternative types of information, e.g. "yes" or "no," "one" or "zero," or "1" or "0."

In an arrangement as described, the current distribution between the winding of the magnet core and the parallel charging circuit of a capacitor is so controlled by the resistance of the reversal of the magnetization that the charging of a capacitor depends upon the information stored in the pertaining core.

By the discharge of the capacitor across the winding of a following similar magnet core the information stored in the preceding core can be transferred to the following core. The connections are so provided that the discharge current appearing upon the discharge of the particular capacitor flows through the discharge circuit and through the winding of the following magnet core in a direction opposite to that of the shifting impulse.

If a plurality of such identical magnetic elements is connected in series, a chain arrangement is obtained in which yes–no informations can be shifted step by step upon the application of shifting impulses.

Now the details and function of a shifting register SR constructed in accordance with the above will be described with reference to FIGS. 2*a* and 2*b*.

Each single element of the chain or register illustrated comprises a magnet core 210, 211 . . . 219 having a rectangular hysteresis characteristic and carrying, respectively, the pertaining winding 220, 221 . . . 229, a chargeable capacitor 230, 231 . . . 239, respectively, together with a charging rectifier 240, 241 . . . 249, respectively, and a discharge resistor 250, 251 . . . 259, respectively, interconnecting the consecutive register elements.

Negative shifting impulses 261 are applied to the input terminal 260 for stepwise shifting of stored information.

For explaining the operation it may be assumed that in the magnet core 210 the information "1" is stored, while all the other magnet cores are in a condition representing "0" which means that no information is stored therein.

Cores with stored information "0" and "1" differ from each other by their response to shifting impulses. While the cores in condition "0" do not respond to shifting impulses, the cores having information "1" stored therein respond by a change of the flux therein, i.e. by developing the above mentioned resistance of the reversal of magnetization.

Under the above assumption of an information "1" stored in the core 210, on application of a shifting impulse 261 a voltage drop develops only in the winding 220 of the core 210 while no such voltage drops develop across the windings of the other cores. The voltage drop across the winding 220 necessarily causes the capacitor 230 to be charged via the rectifier 240.

In this case a corresponding distribution of current occurs between the winding 220 and the circuit of the capacitor 230 in such a manner that the portion of the current flowing through the winding 220 returns the core 210 to the condition corresponding to information "0."

The simultaneously starting discharge of the capacitor 230 via the resistor 250 causes the flow of a transfer current through the winding 221 of the magnet core 211, this transfer current flowing through the winding 221 in a direction which is opposed to that of the flow of current caused by the preceding shifting impulse. The transfer current causes a reversal of the magnetization of the core 211 which is equivalent to a transfer of the stored information "1" from the core 210 to the core 211. Thus the core 211 is changed by reversal of its magnetization from the condition representing stored information "0" to the condition representing stored information "1."

It will be understood that the direction of the currents flowing through the shift register or magnet chain need not be the same as the direction of the shifting of the information because by reversing the polarity of the rectifiers the entire shift register could be operated with positive shifting impulses instead of with negative shifting impulses without changing the effect thereof. Therefore, a fixed relation between the direction of the shifting impulses and the direction of the shift of information does not exist.

It has to be taken into consideration that the intended transfer or shift of information can only take place after the shifting impulse is terminated because during the duration of this impulse all magnet cores are blocked against information transfer. Therefore, the duration of the discharge of the capacitors 230 etc. is to be dimensioned long enough that the charge in the capacitor existing after the termination of the shifting impulse is still sufficient for causing the reversal of magnetization of the next following core.

Evidently, due to the above mentioned blocked condition of all magnet cores during the shifting impulses, it is advisable to provide shifting impulses of as short a duration as possible. The minimum duration of these impulses is therefore determined by the time required for reversing the magnetization of a magnet core until it reaches saturation.

Returning to the above described example, the further transfer of information from the magnet core 211 to the core 212 etc. is carried out analogously. Each individual shifting impulse causes an information "1" stored in any one of the cores to be shifted to the next core which means that *n* shifting impulses cause a shift to the *n*th core.

However, it can be seen that in this manner even a plurality of individual informations stored in consecutive cores can be shifted as a group simultaneously without disturbing the existing relative arrangement or location of the individual stored informations with respect to each other. Also, it can be seen that for the shifting operation in the register only a single winding per core is required.

Of course, whenever required, e.g. for introducing into the register, or for deriving from the register, other pulses, additional windings can be arranged on the cores as shown for instance in FIG. 6, which additional windings however have nothing to do with the shifting of information.

By providing such additional windings on the cores of the register signals may be stored in the register either in serial manner via the winding of a single magnet core, or simultaneously in parallel manner via a plurality of such windings of several magnet cores, respectively. The timing of such signal storing impulses must be so that it occurs between the individual shifting impulses.

Clearing of the entire register of all stored information can be effected by applying a clearing impulse which is applied in a manner quite similar to that used for the shifting impulses except that the clearing impulse must be considerably longer in duration so that it blocks the entire register by magnetization of all the magnet cores until all capacitors have discharged. In fact, the clearing impulse acts exactly like the shifting impulses except that the transfer of information is prevented. The preparation of a counting ring by introducing an information can be effected either by means of an additional winding on one magnet core or by corresponding modification of the clearing circuit.

It can be seen that the great advantage of magnet chains or shift registers of the above described type as compared with other types of chain arrangements resides in the fact that not only one, but also a plurality of the elements of the register may be, at a given moment, in the condition of one type of saturation, while the other elements are in the condition of the opposite saturation. By applying shifting impulses the number of which corresponds to the digit value of the number information to be introduced, all the stored informations in the shift register SR are shifted, and an accumulatory storage, i.e. a counting, is effected when the shift register is connected as a closed ring. On the other hand, for shifting the order position of stored information the shift registers are connected in a chain circuit, and by application of 10 shifting impulses the information in the individual order units (shift registers) is shifted into the respectively following shift registers or order units assigned to the consecutive order position, the relation between the elements of stored information remaining unchanged during the order shift.

FIG. 1 also shows diagrammatically a printing arrangement D for printing the results furnished by the calculating and storage section RW. The printing arrangement D as illustrated in FIG. 1 comprises the printing gates $T_3$, the storage units S*p*, and the magnets M constituting blocking devices as will be described with reference to FIG. 8 which illustrates for explanatory purposes an example of a printing device supplied by the calculating and storage arrangement according to the invention without forming per se part of this invention.

Other components of the arrangement according to the invention and its function will now be explained by referring to an example.

It may be assumed that the digits of the number 1,160.58 are stored in the calculating and storage section RW (FIGS. 1, 2*a*, 2*b*) which is indicated in FIG. 1 by cross-hatching the respective register elements. Therefore, these elements are in the condition of one saturation while the remaining elements are in the condition of the opposite saturation. The above mentioned number may be, e.g. the result of a preceding calculation. Now, it may be assumed, the digits of a number 941.05 are to be added. It may be assumed further that this number 941.05 has been printed by the printing arrangement not forming part of this invention, and simultaneously with the setting of the printing apparatus the multi-contact panel VK has been set accordingly. Therefore, contacts at the positions indicated by small circles at the intersection of the crossing bars of this panel, have been closed, or more specifically, since in FIG. 1 the horizontal lines represent the digits while the vertical lines represent the consecutive order positions, the sequence of closed contacts, starting with the lowest order, is 50149. In order to transfer the thus stored number from the panel VK to the calculating and storage section RW, a starting switch, not shown, in the mechanical portion of the machine is actuated. By this actuation a trigger impulse is applied via the input line 1 to a flip-flop device 2. This flip-flop device 2, shown in greater detail in FIGS. 3 and 3*a*, showing one possible embodiment thereof, is coupled with an astable multi-vibrator MV in such a manner that this multi-vibrator is blocked when the flip-flop is in one of its possible conditions, while the multi-vibrator is free to operate when the flip-flop is in its other possible position so that in this case impulses of a suitable pulse frequency are produced by the multi-vibrator.

The above mentioned trigger signal from input 1 causes the flip-flop 2 to be in the condition in which the multi-vibrator MV is started. Simultaneously therewith, the starting impulse causes via a line 20 another flip-flop arrangement 3 (shown in detail in FIGS. 4 and 4*a*) to assume a condition in which one of the two gates, namely the gate $T_b$ is opened. Simultaneously, a further flip-flop arrangement 4 is moved to that one of its conditions in which all the gates $T_2$ of the control gates 5 located between the consecutive shift registers and illustrated in more detail by FIGS. 5 and 5*a* are opened. Hereby, the individual shift registers $SR_1$ to $SR_n$ of the calculating and storage section RW are each connected in themselves as a ring. Each information impulse moved by a shifting impulse from the last element "9" of an order unit or shift register returns to the element "0" of the same order unit or shift register. Simultaneously, however, such information impulse is also applied to the respectively associated and connected transfer storage US*p* and changes the latter from an idle condition into the opposite, active condition. In the case of the last shift register $SR_n$ the associated gate $T_2$ is connected by a line 20′ with the first transfer storage $USp_1$.

The impulses furnished by the multi-vibrator MV pass through the gate $T_b$ of the device 3 and through line 20″ and the shift pulse generator VG connected therewith to a digit stepping switch ZS illustrated in greater detail in FIGS. 6 and 6*a*. Also this digit stepping switch is composed of a chain or register comprising ferromagnetic storage elements and is fundamentally constructed in the same manner as described in detail above with reference to the shift registers SR (FIGS. 2*a* and 2*b*). However, in the devices ZS each register element is provided with a separate output line connected with the corresponding horizontal bar or digit line, as seen in FIG. 1, of the multi-contact panel VK as is indicated by the application of corresponding numerals in FIGS. 6 and 6*a*.

The uppermost digit line of this panel VK is associated with the digit value "9," while the lowest one is associated with the digit value "1." The first impulse from the multi-vibrator MV entering the digit stepping switch ZS reverses the magnetization of the uppermost element of this register whereby an impulse is generated which is delivered from the output terminal thereof into the digit line assigned to "9." Since in the panel VK in the fifth order position, counting from right to left, the value "9" is set by the contact indicated by a small circle, this impulse travels via the digit line "9" and the just mentioned closed contact and from there through the respective vertical order unit input line to the respective one of the flip-flop arrangements 6 controlling the respective one of the calculating gates $T_4$ which gate is thereby opened. The nine following shifting impulses furnished by the multi-vibrator MV following the above-mentioned first one, are applied not only to the digit stepping switch ZS but simultaneously also through the branch line 7 and through the now open gate $T_4$ to the fifth order unit or fifth register $SR_5$ of the calculating and storage section RW and are "counted" therein, i.e. the information stored in this register $SR_5$ is shifted nine steps. At the same time also the digit stepping switch ZS is also being shifted by these pulses nine steps. The tenth impulse coming from the multi-vibrator MV reverses the magnetization of the last, i.e. lowermost element, of the digit stepping switch ZS whereby an impulse is delivered therefrom through the line 8 and is applied to those of the flip-flops 6 which were in their second position whereby the respective calculating gates $T_4$ are moved to closed condition. At the same time, the previously stored digit information "1" contained in the element "1" of the register $SR_5$ is shifted by the ninth impulse from the element "9" of this register through the respective gate $T_2$ of the respective control gate arrangement 5 back to the element "0" of the same register $SR_5$. In addition, this last mentioned impulse arrives at the pertaining transfer storage $USp_6$ and reverses the magnetization thereof.

In exactly the same manner the digit values 4105 have been stored in the meanwhile by the stepwise operation of the switch ZS in the respective order units or shift registers $SR_1$, $SR_4$, $SR_3$, and $SR_2$. After the digit stepping switch ZS has completed its stepping cycle from "9" to "0" all the flip-flop arrangements 6 are in the condition in which the respective calculating gates $T_4$ are closed and the second, fifth and sixth transfer storage $USp_2$, $USp_5$, and $USp_6$, respectively, have undergone a reversal of magnetization and are in a condition preparatory for carrying out a transfer.

The last or tenth impulse leaving the digit stepping switch ZS travels via the line 8 also to the flip-flop arrangement 2 and causes the latter to assume "stop" condition. Hereby, the multi-vibrator MV is cut off.

However, the same impulse traveling through line 8 acting on the flip-flop arrangements 6 and causing closing of the gates $T_4$ as described above has actuated a transfer control UW which now starts to deliver read-out impulses into the transfer storages via line 9.

The details of the transfer control UW is not part of the present invention. This transfer control may also be constructed as a shift register. This shift register may be connected with a start-stop multi-vibrator arrangement similar to the above described flip-flop arrangement 2, and delivers impulses to a shift impulse generator associated with the shift register in the control UW until the information which was originally stored in the first element of this particular shift register and has been shifted with every impulse one step forward, is delivered by the last element of this register and is applied to the last mentioned flip-flop arrangement in such a manner that the respective multi-vibrator is blocked thereby.

Of course, the register in the transfer control must have as many register elements as there are transfer storages in the calculating and storage section RW. Now, when the transfer control is started it will automatically complete one cycle and upon the reversal of magnetization of each of its elements one read-out impulse is transmitted through the line 9 to the transfer storages $USp_1$ . . . $USp_n$. Whenever such a read-out impulse meets one or more of the just mentioned transfer storages in the above mentioned preparatory condition for transfer, which is the case, in the present example, in the second, fifth and sixth transfer storage, then the magnetization of the particular transfer storage is reversed and the latter is brought back to its previous condition.

By this reversal of magnetization of a transfer storage associated with one particular order unit or shift register a trigger impulse is generated and applied to the adjoining shift pulse generator of the next higher order unit, e.g. from the transfer storage $USp_6$ of the shift register $SR_5$ to the shift pulse generator $VG_6$ of the shift register $SR_6$. Consequently, the respective shift impulse generator delivers a shift impulse to the associated order unit or shift register i.e. it shifts the information stored therein one step, or, in other words, it adds the digit value "1" to the stored digit value. In this case the associated transfer storage is changed to a condition preparatory for such further transfer to the next following shift register or order unit, and upon the arrival of the second read-out impulse from the transfer control UW this second transfer is again carried out and introduced into the next following higher order unit or shift register. In the interest of complete reliability of the arrangement read-out impulses must be repeated as often as there are transfer storages in the arrangement.

Another function to be performed by the arrangement according to the invention is the shifting of the order position of all stored informations in the direction from right to left, i.e. from the lower order to the next higher order. This operation will now be explained. For this purpose, an order shifting impulse is introduced through the input line 11 whereby the flip-flop arrangement 2 is caused, in the same manner as described above, to change to that condition in which the associated multi-vibrator MV is started so as to furnish a series of impulses.

The order shift impulse applied through the line 11 is simultaneously delivered via line 12 to the flip-flop arrangement 3 whereby the latter is caused to open the respective gate $T_a$ so that the impulses delivered by the multi-vibrator MV are now delivered to the order shift register DV via line 13. At the same time, the impulse applied to the flip-flop arrangement 3 travels from the line 12 to the flip-flop arrangement 4 and changes the condition of the latter in such a manner that the gates $T_2$ of the control gate arrangements 5 are moved to closed condition while at the same time the gates $T_1$ thereof are moved to open condition. Consequently, the individual shift registers SR are not any more connected in themselves each as a ring but they are all connected with each other as a continuous chain. Therefore, an impulse leaving the last element "9" of a shift register SR does not return to the element "0" of the same shift register, but is transmitted to the element "0" of the next following order unit or shift register. However, in this case, no transfer impulse is applied to any one of the transfer storages $USp$ since only gates $T_1$ are open while gates $T_2$ are closed.

The order shift register DV is also a magnetic shift register of the type described above and composed of ten elements. Upon the arrival of each shift impulse the magnetization of one element of this register is reversed while at the same time an impulse from MV via line 20″ is applied via the line 13 to all the shift pulse generators $VG_1$ to $VG_n$ of the calculating and storage section RW. Since the register DV has ten elements ten shifting impulses are applied during this operation to each order unit or shift register SR of the section RW whereby the stored information in each order unit or shift register is transferred to the order unit or shift register assigned to the next higher order. During this order shifting operation it is possible that at the same time two digit values are shifted within one particular order unit or shift register. As has been stated above, this is possible in a shift register of the above described type without any difficulty because it is possible in such a register to shift even more than two digit value informations without affecting its operation.

The tenth impulse leaving the order shift register DV travels via line 14 to the flip-flop arrangement 2 and returns the latter to its previous condition whereby the order shifting operation is terminated.

It can be seen from the above without difficulty that the arrangement according to the invention, subject to the addition of corresponding control devices, may be used also for multiple addition, i.e. for multiplications including preliminary or consecutive order shift operations. Also, electronic accessory devices may be provided which are capable of converting a number set in the multi-contact panel VK into its complementary value so that also subtractions and even multiple subtractions, i.e. divisions, can be carried out with the aid of the arrangement according to the invention.

A result stored in the calculating and storage section RW, i.e. a first introduced and stored number plus an added number, must be printed in a bookkeeping machine as a new result in the corresponding column. This may be carried out by means of an arrangement not forming part of the present invention but illustrated for explanatory purposes by FIG. 8. The essential components of this device are illustrated diagrammatically in FIG. 1 by the elements LS, RU, $T_3$, $Sp$, and M. Generally, this device operates as follows. The forward movement of the control bars 111 (FIG. 8) which control each setting of a different one of the printing or number rollers 101, is effected by drive means, not shown, in such a manner that they are urged forward independently from each other, yet simultaneously, the bar 689 forming part of the drive means as a means for controlling the forward movement of any or all of the bars 111 through up to ten steps corresponding respectively to the printing positions of the numbers "0"–"9" on the number rollers 101, but any one of the bars 111 may be stopped in a position corresponding to a printing position of a number on the associated roller 101, by the engagement of a locking pin 134 into a rack 133 attached to a portion 112 of the respective control bar 111. The stopping of one bar 111 does not interfere with continuing movement of any other bar 111. Therefore blocking magnets 144 and locking pins 134 actuated thereby are provided in a number equal to that of the control bars 111. Simultaneously with the movement of bars 111, more particularly with the movement of bar 689 impulses are generated, for instance by the rotary light stop 691 cutting across a beam of light directed from the light source 600 to the photo-sensitive element 600″, the member 691 being moved by drive means 689 operated jointly with the movement of the bars 111, and are utilized as follows. The light stop arrangement 600, 600", 691 is represented in FIG. 1 by the block LS. During the shift of the control bars 111 for changing the printing wheels 101 between the positions "0" and "9" the light stop arrangement LS furnishes 11 consecutive impulses. These impulses are introduced into a complement former RU. The unit RU is to be considered as an impulse generator which responds to each impulse received from LS by producing a series of shifting impulses, the first series comprising ten shifting impulses, and the following ten series comprising each nine impulses. The first impulse coming from the device LS is transformed by the complement former RU into a series of ten shifting impulses which are used for revolving the entire stored information in the entire calculating and storage section RW once. During this operation the individual control units or shift registers SR are connected as individual rings. Therefore, after the application of this first series of ten impulses all the individual elements of the individual shift registers SR are again in their previous condition so that the same information is stored in the whole calculating and storage section as before. However, upon the arrival of the last impulse of said series thereof, all those shift registers SR which had contained stored information representing "0" deliver an output signal every time when the step from "9" to "0" is performed, and this output signal causes the respective blocking magnets M (FIG. 1) or 144 (FIG. 8) to move the respective locking pin 134 into engagement with the rack 133 of the associated control bar 111 so that the latter is locked in a position determining a corresponding printing position of the associated number roller 101.

During the forward movement of the control bars 111 the light stop device LS furnishes after said first impulse ten further impulses which are applied to the complement former RU, each of these ten impulses causing the latter to furnish a series of now nine impulses. Each of these series of nine impulses serve to shift the information stored in the various shift registers RW nine steps forward which means that indirectly the entire stored information in each shift register SR is reduced by a digit value "1".

If upon the application of the ninth impulse of such a series of impulses a transition from "9" to "0" occurs then an actuating or output signal is delivered from the respective shift register to the respectively associated blocking magnet M (FIG. 1) or 144 (FIG. 8) which now locks the associated control bar 111 in the corresponding digit position.

As a whole a first series of ten impulses and then ten series of nine impulses each are applied to each individual shift register SR. This amounts to a total of 100 impulses so that the calculating and storage section RW returns, after completion of the printing read-out to its original information content.

On account of the locking of the control bars 111 in accordance with the desired digit values the type or number rollers are now positioned in accordance to the respective digit values stored in the calculating and storage section RW so that now the printing can be effected.

In view of the above description of the various components of FIG. 1 it is obvious in what manner the impulses applied from the complement former RU to the flip-flop arrangement 4 cause the shifting of the information stored in the various shift registers SR, and in what manner the other impulses furnished by the device RU operate the printing gates $T_3$ and how impulses delivered from the last elements "9" of the various shift registers SR pass through the printing gates $T_3$ and intermediate storage devices $Sp$ to the blocking magnets M.

After the mechanical printing operation is completed the information stored in the calculating and storage arrangement may be cancelled completely by the above described clearing operation, or the information stored in the arrangement may be subjected to further processing e.g. by the introduction of the digits of another number into the arrangement.

It should be mentioned that the main component of the complement former RU is again a ferro-magnetic shift register of the general type described above and illustrated in FIG. 8 schematically as being composed of a plurality of register elements G1, G2, G3, etc.

Summing up the advantages obtained by the arrangement according to the invention, an electronic arrangement of the described structure being composed only of ferro-magnetic elements can be built so as to occupy a very small space so that it can be attached as a small accessory to an existing bookkeeping machine or even be mounted therein.

Moreover, stored informations in a ferro-magnetic register remain available even after the source of energy operating the whole device has been switched off so that even on the next following work day, after switching on again the power supply, the whole arrangement can be further used starting with the still available stored information therein. This is only possible due to the use of ferro-magnetic elements. All other known electronic calculating devices lose the stored information the moment the power supply is switched off.

The energy consumption of an arrangement according to the invention amounts only to a fraction of that which is required in electronic calculating machines utilizing tubes. In addition, tube equipped electronic calculators require considerably more space. Moreover, tube equipped electronic calculators are bound to generate substantial amounts of heat so that operational difficulties develop due to the necessity of removing the developed heat.

The arrangement according to the invention is entirely reliable in its operation and it is simple to service and to maintain. On the other hand, a tube equipped calculating arrangement calls for continuous servicing and maintenance, exchange of broken down tubes.

Above all, one of the greatest advantages of the present invention is the above described extremely simplified order shifting operation.

It will be understood that each of the elements described above, or two or more together, may also find a useful application in other types of electronic storage and calculating arrangements differing from the types described above.

While the invention has been illustrated and described as embodied in an electronic storage and calculating arrangement for processing multi-order numbers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electronic storage and calculating arrangement for processing multi-order numbers, in combination, an electronic accumulator arrangement comprising a plurality of shift registers sequentially assigned to consecutive orders of said numbers respectively, and having each a series of ferromagnetic cores sequentially assigned to different digits and having a rectangular hysteresis characteristic and each being capable of storing alternatively digit-representing and no-digit representing information depending upon the polarity of magnetic saturation thereof, and including circuit means for applying impulses of predetermined polarity for reversing the polarity of an existing magnetization of said cores and for shifting stored information along said series of cores; circuit means interconnecting said shift registers and including switching means capable of establishing alternatively either one of two connections of said shift registers, one connection serving to close each individual shift register to a shift ring in itself for transferring digit information from the last core of the particular register to the first core thereof upon the application of one of said impulses, the other connection serving to connect said plurality of shift registers to a chain of registers for shifting, upon application of said impulses, the information stored in each individual one of said shift registers assigned to respective orders, to the respectively sequent shift register assigned to a different order whereby the total stored digit information is shifted by one order step; and input means for applying said impulses to said shift registers, said input means comprising multi-contact panel means having a plurality of longitudinal conductors respectively assigned to different digit values, a plurality of transverse conductors respectively assigned to consecutive orders of numbers to be processed, each of said transverse conductors being respectively connected in circuit with one of said shift registers assigned to the respective order, and a plurality of contact means arranged at the intersections of said longitudinal and transverse conductors and settable to connect respectively said intersecting conductors for establishing a desired association between digits of said number and their respective order position therein, and digit stepping switch means responsive to the application of a series of control impulses and capable of, and connected with said longitudinal conductors, for applying a sequence of shift impulses sequentially to said longitudinal conductors, respectively, in accordance with the sequence of said series of control imulses, for sequential transmittal of said shifting impulses to said shift registers in accordance with the setting of said contact means whereby the digit values of the number to be processed are transferred in the set order positions into the respective shift registers.

2. An arrangement as claimed in claim 1, comprising a plurality of second gate means arranged between said input means and said shift registers, respectively, each of said second gate means including a switch device connected in parallel with said digit stepping switch means between said input means and the respective shift register for applying said series of control impulses to said respective shift register when said switch device is in conductive condition, and first switch actuating means connected with the respective transverse conductor of said multi-contact panel for changing said switch device to conductive condition in response to the first shift impulse delivered by said respective transverse conductor whereby a path for said series of control impulses is opened to be applied as shift impulses to the respective shift register.

3. An arrangement as claimed in claim 2, wherein said circuit means further include transfer means for transferring digit information stored in the last core of any one of said shift registers respectively assigned to a particular order, when said shift registers are connected by the respective switching means as shift rings in themselves, upon the application of one of said impulses as a carry-over signal to the respectively sequent shift registr assigned to the respectively next higher order, simultaneously with said transferring of digit information from said last core of said one shift register to the first core thereof, said transfer means including a plurality of transfer storage means, each respectively associated and connected with one of said shift registers for receiving said carry-over signal therefrom, each of said transfer storage means being capable of storing such carry-over signal, and being connected with the first core of the respectively sequent shift register for delivering, upon being activated by a transfer release pulse, said stored carry-over signal to said sequent shift register as a shifting impulse, and transfer control means connected with all of said transfer storage means for applying to them transfer release pulses for causing thereby those of said transfer storage means in which a carry-over signal was stored, to release and to deliver such carry-over signal, each of said second gate means including second switch actuating means connected with said digit stepping switch means for changing said switch device of the respective second gate means to non-conductive condition in response to the last one of said sequence of shift impulses issued thereby in accordance with said series of control impulses.

4. An arrangement as claimed in claim 3, wherein said digit stepping switch means is connected with said transfer control means for starting the latter to deliver said transfer release pulses upon application of said last one of said sequence of shift impulses issued by said digit stepping switch means in accordance with said series of control impulses.

5. An arrangement as claimed in claim 4, wherein said multi-contact panel means have nine longitudinal conductors respectively assigned to digit values from "1" to "9," and wherein said digit stepping switch means is a shift register means of ten ferro-magnetic elements, its consecutive elements being respectively connected with said longitudinal conductors for sequentially applying said shift impulses thereto as said elements are consecutively actuated by said series of control impulses, the tenth one of said ten elements being connected both with said transfer control means and with said second switch actuating means of all of said second gate means for actuating said means when said tenth one of said ten elements is actuated to issue an impulse.

6. An arrangement as claimed in claim 2, including order shift means for shifting, in response to a series of control signals applied thereto, any information stored in any of said shift registers assigned respectively to consecutive orders, when said shift registers are connected as a shift register chain, from each of said shift registers assigned to one particular order to the sequent shift register assigned to the next higher order, said order shift means being a counting chain having ten ferro-magnetic elements responding, to application of the last one of a series of ten control impulses applied consecutively to the first element thereof, by delivering a terminating impulse from the last element thereof, a source supplying a series of at least ten control impulses being connected to said first element of said counting chain and also to the first elements of all of said shift registers assigned to respectively different orders whereby any information stored in any one of said shift registers is shifted to the respectively sequent shift register assigned to the respectively next higher order, the last element of said counting chain being connected with said source of control impulses for causing the latter to discontinue the supply of said control impulses upon delivery of said terminating impulse.

7. An arrangement as claimed in claim 4, wherein said transfer control means comprises a shift register having as many ferro-magnetic elements as there are shift registers assigned to respectively different orders, for applying a corresponding number of said transfer release pulses to said transfer storage means upon application, to said transfer control means, of said last one of said sequence of shift impulses issued by said digit stepping switch means.

8. An arrangement as claimed in claim 1, wherein mechanical control means of an associated machine are connected with said contact means of said multi-contact panel means for setting the latter selectively for representing and storing in said panel means the digit values of a number to be processed.

9. An arrangement as claimed in claim 1 including means for transferring, when said individual shift registers are respectively connected as shift rings in themselves, the information stored in the shift register assigned to the highest order to the transfer storage of the shift register assigned to the lowest order.

References Cited in the file of this patent

UNITED STATES PATENTS

| | | |
|---|---|---|
| 2,019,704 | Hofgaard | Nov. 5, 1935 |
| 2,181,166 | Austin | Nov. 28, 1939 |
| 2,604,262 | Phelphs | July 22, 1952 |
| 2,692,551 | Potter | Oct. 6, 1954 |
| 2,778,006 | Guterman | Jan. 15, 1957 |
| 2,955,759 | Wolf | Oct. 11, 1960 |

FOREIGN PATENTS

| | | |
|---|---|---|
| 709,408 | Great Britain | May 26, 1954 |

OTHER REFERENCES

"High Speed Computing Devices" by Engineering Research Associates, McGraw-Hill Book Co., New York, 1950.

"Digital Computing Systems" by Williams, McGraw-Hill Book Co., New York, 1959.